Aug. 16, 1949.  R. V. BERNIER  2,478,891
THREE-DIMENSIONAL ADAPTOR FOR MOTION-PICTURE PROJECTORS
Filed Nov. 4, 1947  4 Sheets-Sheet 1
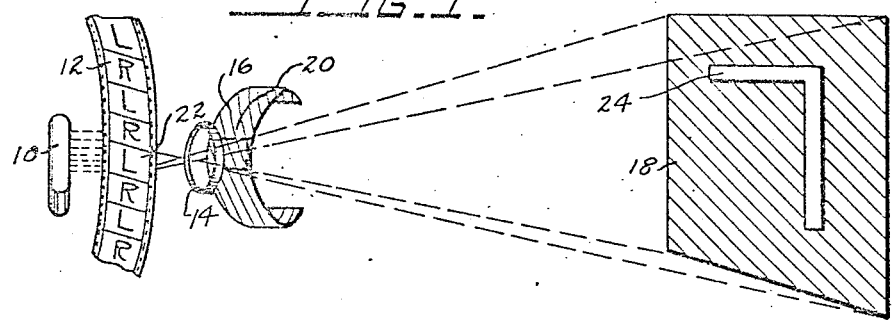
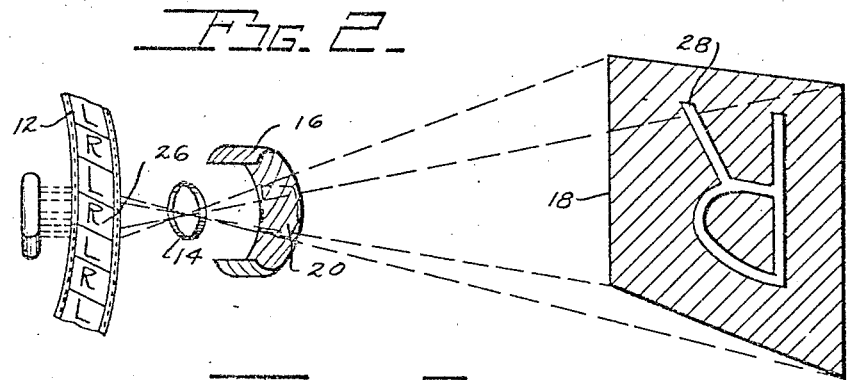
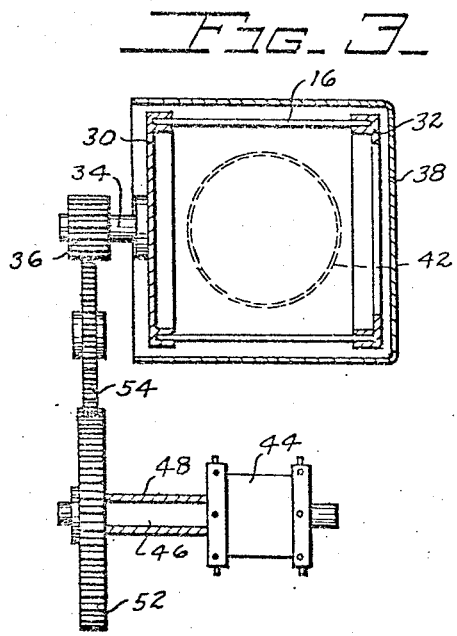
INVENTOR.
ROBERT V. BERNIER
BY Wade Koontz AND
Frederick W. Cotterman
ATTORNEYS Aug. 16, 1949.  R. V. BERNIER  2,478,891
THREE-DIMENSIONAL ADAPTOR FOR MOTION-PICTURE PROJECTORS
Filed Nov. 4, 1947  4 Sheets-Sheet 2

TO THE LOWER FILM REEL

INVENTOR.
ROBERT V. BERNIER
BY Wade Koontz AND
Frederick W. Cotterman
ATTORNEYS

Aug. 16, 1949.  R. V. BERNIER  2,478,891
THREE-DIMENSIONAL ADAPTOR FOR MOTION-PICTURE PROJECTORS
Filed Nov. 4, 1947  4 Sheets-Sheet 3

INVENTOR.
ROBERT V. BERNIER
BY Wade Kroutz AND
Frederick W. Cotterman
ATTORNEYS

Aug. 16, 1949. R. V. BERNIER 2,478,891
THREE-DIMENSIONAL ADAPTOR FOR MOTION-PICTURE PROJECTORS
Filed Nov. 4, 1947 4 Sheets-Sheet 4

INVENTOR.
ROBERT V. BERNIER
BY Wade Koontz AND
Frederick W. Cotterman
ATTORNEYS

Patented Aug. 16, 1949

2,478,891

UNITED STATES PATENT OFFICE 2,478,891

THREE-DIMENSIONAL ADAPTER FOR MOTION-PICTURE PROJECTORS

Robert V. Bernier, Dayton, Ohio

Application November 4, 1947, Serial No. 783,885

14 Claims. (Cl. 88—16.6)

(Granted under the act of March 3, 1883, as amended April 30, 1928; 370 O. G. 757)

The invention described herein may be manufactured and used by or for the Government for governmental purposes without payment to me of any royalty thereon.

This invention relates to an attachment for a motion picture projector by means of which a standard motion picture projector is made available for projecting three-dimensional films.

An object of the invention is to provide for the above purpose a simple attachment which is instantly removable, and, when removed, leaves no obstruction which may interfere with the operation of the projector as used in standard practice.

Another object is to provide a polarized filter operated by the movement of the film and synchronized by the latter to the movement of each frame.

Another object is to provide a polarized filter of cylindrical or semicylindrical contour which may be rotated by movement of the film, the cylinder being polarized in such a manner that polarization is reversed at each half turn of the cylinder.

Another object of the invention is to provide a cylindrical or semicylindrical filter, so polarized that, in revolving, it first polarizes a frame in a direction forty-five degrees upward and to the left and the next frame in a direction forty-five degrees upward and to the right.

Another object is to provide a mechanism which permits adjusting the synchronization of the polarization to successive frames.

Another object is to provide means for interchanging the polarization of alternate frames.

Other objects and advantages will become evident as the invention is described in detail with reference to the drawings, wherein:

Fig. 1 is a schematic illustration showing how a semicylindrical filter is polarized so as to reverse the polarity at each half turn of the cylinder.

Fig. 2 is a view similar to Fig. 1 except that the film has been advanced one frame and the semicylindrical filter has been turned one hundred eighty degrees.

Fig. 3 is a schematic sectional view of the semicylindrical filter and its driving mechanism as seen on the line 3—3 of Fig. 4.

Fig. 8 is a perspective view of the bracket which is secured to a standard projector for holding the attachment in operating position.

Like reference characters refer to like parts throughout the several views.

Figure 4:
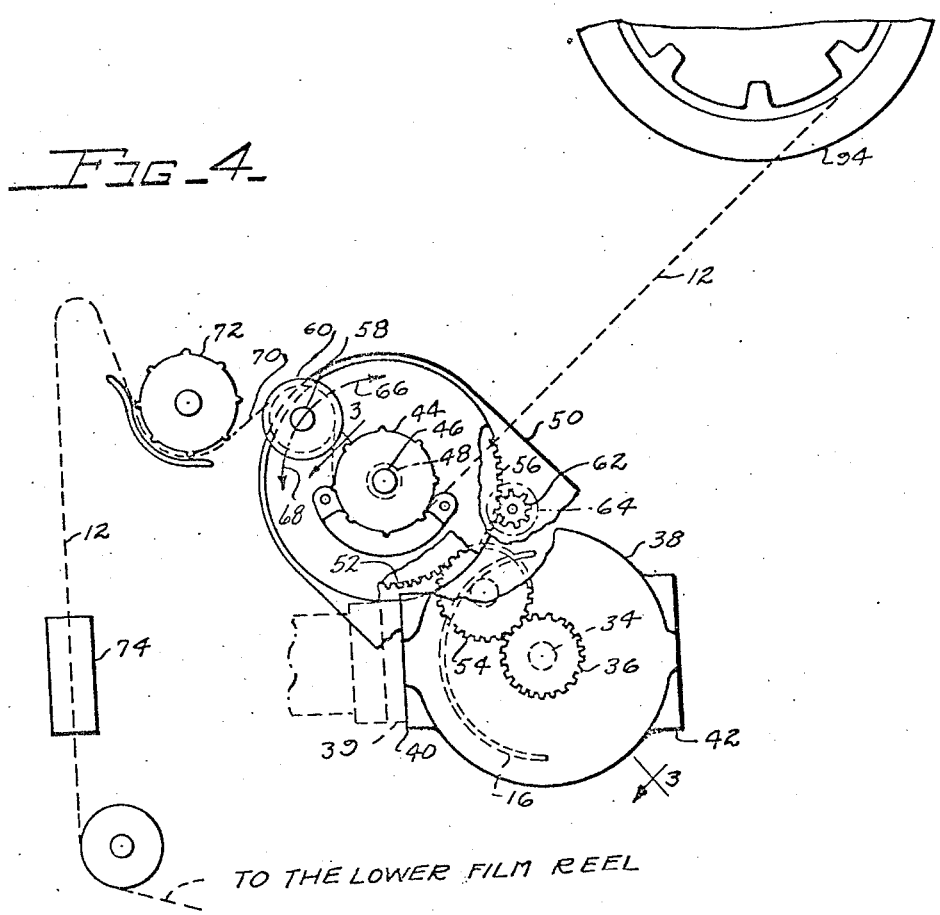
Fig. 4 is a schematic view showing the arrangement of the semicylindrical filter with respect to parts of the standard projector.

The invention herein disclosed requires that three-dimensional film be used with the right and left stereoscopic images spaced alternately, and that the viewers of the picture wear conventional three-dimensional Polaroid spectacles.

In Fig. 1, light from a source 10 is allowed to pass consecutively through a film 12, a lens 14 and a filter 16 to the screen 18. The film 12 is of the three-dimensional type wherein the right and the left stereoscopic images are spaced alternately. The filter 16 is semicylindrical and positioned to be rotated on its axis which preferably is in the same plane as but normal to the lens axis. Polarization 20 of the semicylinder when viewed from the outside is at forty-five degrees upward and to the left, i. e., as in a forty-five degree external right-hand helix. A frame 22 having a left stereoscopic image therein is centered on the lens axis. The image 24 on the screen 18 may be seen with the left eye only by a viewer wearing standard Polaroid spectacles.

In Fig. 2, the film 12 has been advanced so that a frame 26 having a right stereoscopic image thereon is centered on the lens axis while the filter 16 has been revolved one hundred eighty degrees from the position it occupied in Fig. 1. It is noted that, in Fig. 1, the outside of the semicylindrical filter 16 is presented to the lens 14 while in Fig. 2 the inside of the semicylindrical filter is presented to the lens 14. Moreover, the same lines 20 of polarization which in Fig. 1 extended upwardly and to the left, now extend upwardly and to the right. The image 28 on the screen 18 may be seen with the right eye only by a viewer wearing standard Polaroid spectacles. It will be evident that, by employing film the frames of which alternate left to right at a suitable number of alternations per second and coincidentally revolving the filter 16 one hundred eighty degrees at each alternation, a viewer wearing standard polaroid spectacles will see the left frames with the left eye only and the right frames with the right eye only which is the principal requirement for three-dimensional motion pictures.

Figs. 1 and 2 merely disclose the principle upon which the invention operates. Figs. 3 and 4, however, illustrate, more or less schematically, the principal parts of the mechanism employed and the cooperation of the parts in carrying the invention into effect.

Referring more particularly to Figs. 3 and 4, a semicylindrical filter 16 may be made by bending a sheet of thin transparent material to semicylindrical form and holding the sheet to that form by means of circular inner and outer end heads 30 and 32 which contain semicircular grooves for securing the edges of the filter. The edges of the filter may be retained in the grooves by any suitable cement.

A shaft 34 carrying a pinion 36 is drivably connected to the end head 30. A casing 38 has a short sleeve 40 extending rearward for joining to the lens holder 39 and another sleeve 42 extending forward for passing the light to the projector screen 18. Sleeves 40 and 42 are centered on the axis of the lens.

A standard eight tooth film sprocket 44 is fast on the shaft 46 which is rotatably supported in a bearing 48 carried by the framework 50 of the attachment. A gear 52 is also fast on the shaft 46 whereby the sprocket 44 and gear 52 rotate as one. An idler gear 54 connects the gear 52 to the pinion 36.

Concentric with but independently rotatable with respect to the sprocket 44 and gear 52 is a gear 56 (see Fig. 4) which carries a stud 58 near its periphery upon which a film guide idler pulley 60 is freely rotatable. A pinion 62, permanently meshed with the gear 55, is manually rotatable by the knob 64, whereby the stud 58 may be moved in the direction of the arrow 66 or the arrow 68 to respectively lengthen or shorten the film loop 70, whereby the sprocket 44, and consequently the semicylindrical filter 16, will be advanced or retarded with respect to the projector drive sprocket 72 which maintains synchronism with the movement of the film by the shuttle mechanism (not shown) through the film gate 74. The ratio of the gear 52 to the pinion 36 is preferably such that one eighth turn, i. e., a movement of one tooth span of the attachment sprocket 44, which equals one frame of the film, will require about one sixteenth turn of the adjusting gear 56. This will rotate the semicylindrical filter 16 through one-half turn, whereby polarization of filter 16 with respect to any frame of the film 12 is reversed. Thus the increase or decrease of the length of film between the projector sprocket 72 and the attachment sprocket 44 of one frame permits interchanging the polarization of the right and left images should a scene on the film be spliced with the frames improperly sequenced. Adjustments of lesser amounts facilitate bringing the filter into coincidence with its proper frame when the off condition amounts to part only of a frame.

Figure 5:
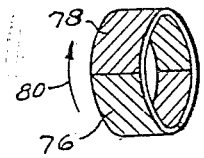
Fig. 5 is a perspective view of an alternate filter which consists of a complete cylinder composed of two semicylinders of transparent material the two semicylindrical halves being polarized in oppositely helical lines.
Figure 6:
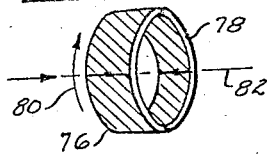
Fig. 6 is a perspective view of the filter shown in Fig. 5 after the cylinder has been rotated on its axis one-quarter turn, illustrating how the polarization in opposite halves of the cylinder coincide when the lens axis passes through the mid-point of the two halves.
Figure 7:
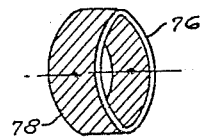
Fig. 7 represents the same cylinder after it has been rotated on its axis one-half turn from the position seen in Fig. 6.
Figure 6:
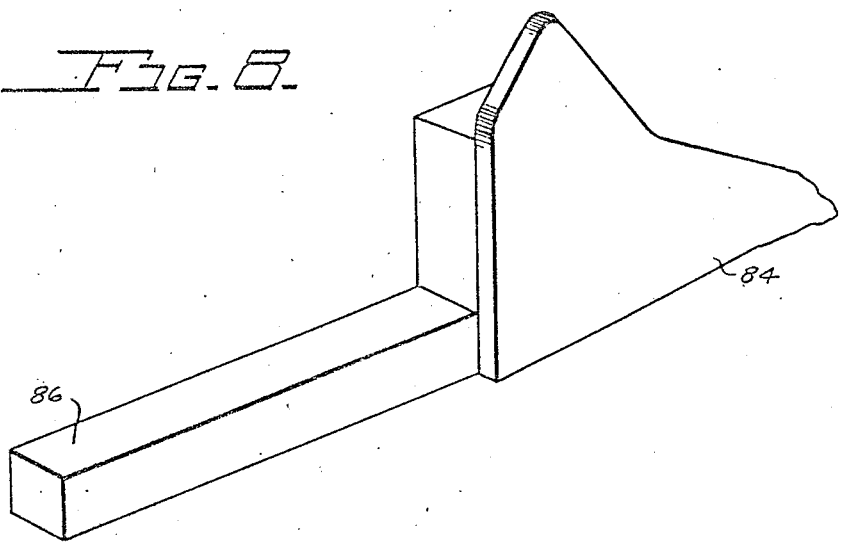

Figs. 5 through 7 show an alternate method of reversing polarization by using a filter comprising a complete cylinder of transparent material instead of the semicylinder heretofore disclosed relative to Figs. 1 through 4. The alternate cylinder may consist of a single piece polarized as shown in Fig. 5 or it may comprise two half cylinders 76 and 78 held together in any suitable manner.

If a cylindrical filter, having been polarized as seen in Fig. 5, is rotated one-quarter turn in the direction of the arrow 80 to the position seen in Fig. 6, polarization viewed along the line 82 will be upward and to the left in both front and rear halves 76 and 78, while if the filter is then turned an additional half turn to the position seen in Fig. 7, polarization will be upward and to the right. Obviously a filter constructed as in Figs. 5 through 7 may replace the filter 16 shown and discussed with reference to Figs. 1 through 4.

In order to provide, for the attachment herein disclosed, a means to quickly affix or remove the device to or from a standard projector, a bracket 84, Fig. 8, is provided and permanently secured to the body of the projector in such a position that it will not interfere with any of its normal functions. The bracket 84 includes a bar 86 which may preferably be of square or rectangular cross section upon which the attachment may be supported in proper position. The bracket 84 is shaped and otherwise adapted for permanent attachment to the Ampro 16 mm. sound projector but obviously may necessarily be otherwise shaped and adapted for attachment to other sizes and makes of projectors.

Figure 9:
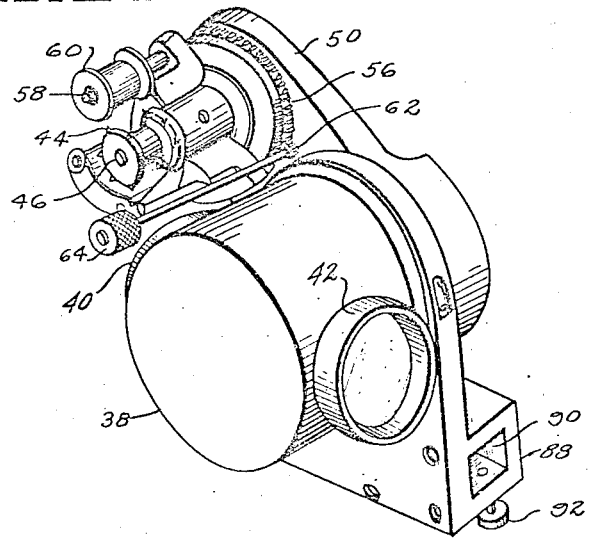
Fig. 9 is a perspective view of the attachment which is the subject of this invention.
Figure 10:
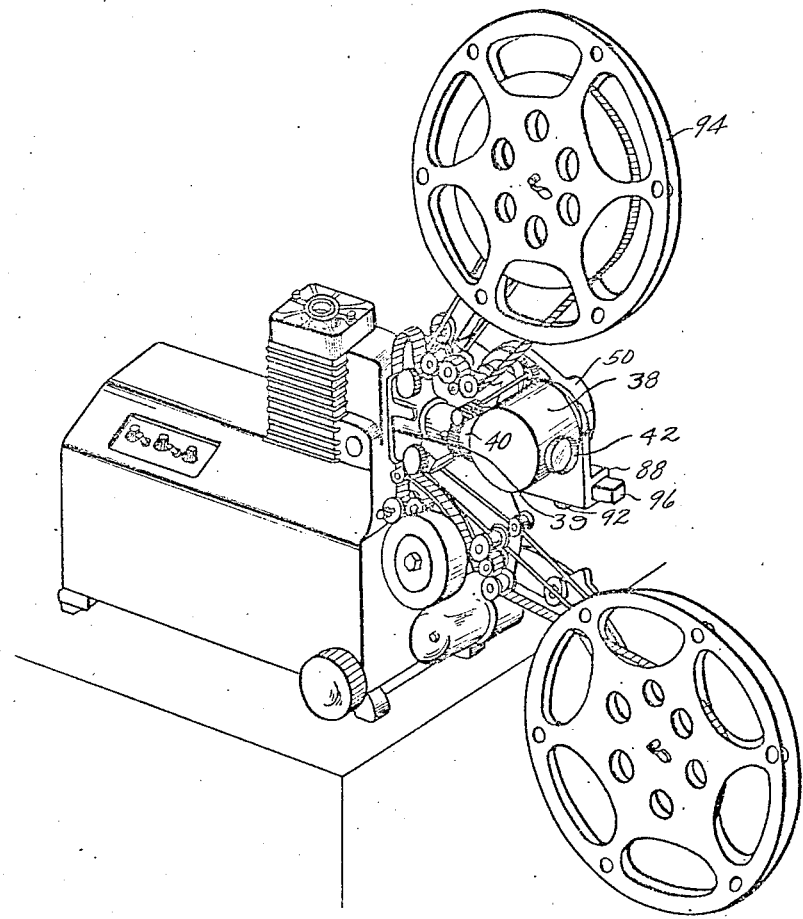
Fig. 10 shows the attachment in place on a standard projector.

The attachment assembly, the operating parts of which have been shown and described with reference to Figs. 1 through 4 is shown in perspective in Fig. 9, which, in addition to some of the operating parts already described includes a guide portion 88 having an opening 90 which is slidable over the bar 86 to which it may be fixed against endwise movement by a screw 92 in the position where the short sleeve 40 of the casing 38 makes connection with the lens holder 39 (see Figs. 4 and 10).

Having secured subject attachment to a standard projector, the film is threaded in the usual manner except that instead of proceeding from the upper reel 94 directly to the projector sprocket 72 (see Fig. 4) it passes first under then over the attachment sprocket 44 and guide pulley 60 respectively.

If, after threading the film 12, it is found that the filter 16 is out of registry with a frame of the film, a slight turn of the knob 64 will effect registry. If it is then found that the polarization of alternate frames is the reverse of what it should be, that may be corrected by turning the knob 64 to such a degree as will advance or retard the filter one-half turn with respect to the projector feed sprocket 72. Such adjustment may be made before or during projection.

Aside from simplicity in general construction, the attachment herein disclosed has a considerable number of advantages: (1) Employing motive power taken from the film sprocket 72 of the standard projector and transmitting it through the film itself to the driving sprocket 44 of the attachment, obviates the necessity of a belt drive or similar power transmitting element. (2) Simplicity in obtaining a ninety degree difference in the polarization of the projected right and left image on the screen by the use of a rotary polarizer as compared with such patented features as mirror beam splitters and mechanically synchronized shutter arrangements. (3) Single beam projection which eliminates screen registration problems, which result when "two lens" or "beam splitter" methods are used. (4) Simplicity of interchanging the polarization of the right and left image during projection. (5) Simplicity of adaptation to many types of projectors.

Having described my invention, I claim:

1. Motion picture projecting equipment which comprises, in combination, a projector including a lens, a film comprising a series of frames in place in said projector in back of said lens, the frames of said film having right and left stereoscopic images spaced alternately, a semi-cylindrical transparent polarized filter in front of said lens having its axis of rotation in the same plane as the axis of said lens but normal to the axis of said lens, polarization of the outside of said filter being in the direction of a righthand helix, whereby when the midsection of the semicylindrical surface passes through the plane of the cylinder and lens axes with the outside of the cylindrical surface toward the lens, polarization of the semicylindrical surface will be upward and to the left, and when the midsection of the semicylindrical surface passes through said plane with the inside of said cylindrical surface toward said lens, polarization of said semicylindrical surface will be upward and to the right.

2. Motion picture projecting equipment which comprises, in combination, a projector including a lens, a film comprising a series of frames in place in said projector in back of said lens, the frames of said film having right and left stereoscopic images spaced alternately, a semicylindrical transparent polarized filter having its convex surface in front of and facing said lens and having its midsection on the axis of said lens and its axis of rotation in the same plane as the axis of said lens but normal to the axis of said lens, polarization of the outside of said filter in this position being upward and to the left, whereby, when the midsection of the semicylindrical surface is turned on its axis through one hundred eighty degrees from said position, polarization of said semicylindrical surface viewed from said lens will be upward and to the right.

3. For use in connection with motion picture projecting equipment consisting of a projector including a lens and a film comprising a series of frames in place in said projector in back of said lens, the frames of said film having right and left stereoscopic images spaced alternately, the improvement which comprises a semicylindrical transparent polarized filter located in front of said lens and having its axis of rotation in the same plane as the axis of said lens but normal to the axis of said lens, polarization of the outside of said filter being in the direction of a righthand helix, whereby when the midsection of the semicylindrical surface passes through the plane of the cylinder and lens axes with the outside of the cylindrical surface presented to the lens, polarization of the semicylindrical surface will be upward and to the left and when the midsection of the semicylindrical surface passes through said plane with the inside of said cylindrical surface presented to said lens, polarization of said semicylindrical surface will be upward and to the right.

4. For use in connection with motion picture projecting equipment consisting of a projector including a lens and a film comprising a series of frames in place in said projector in back of said lens, the frames of said film having right and left stereoscopic images spaced alternately, the improvement which comprises a semicylindrical transparent polarized filter having its convex surface turned toward said lens and having its axis of rotation in the same plane as the axis of said lens but normal to the axis of said lens, polarization of the said filter in this position being upward and to the left, whereby, when the midsection of the semicylindrical surface is turned one hundred eighty degrees from said position, polarization of said semicylindrical surface will be upward and to the right.

5. For use in connection with motion picture projecting equipment consisting of a projector including a lens and a film comprising a series of frames in place in said projector in back of said lens, alternate frames having right and left stereoscopic images thereon, the improvement which comprises, a transparent polarized filter in the form of a segment of a hollow cylinder having its convex surface turned toward said lens and having its axis of rotation normal to the axis of said lens and approximately in the same plane as the axis of said lens, polarization of the said filter in this position viewed from the lens being approximately along a forty-five degree helix, whereby, when the convex surface is rotated substantially one hundred eighty degrees from said position, polarization of said filter viewed from said lens will be along a forty-five degree helix of opposite hand as the first said helix.

6. For use in connection with motion picture projecting equipment which consists of a projector including a lens and a film comprising a series of frames in place in said projector in back of said lens, alternate frames having right and left stereoscopic images thereon, the improvement which comprises a transparent polarized filter in the form of a segment of a hollow cylinder having its convex surface turned toward said lens and having its axis of rotation substantially normal to the axis of said lens and approximately in the same plane as the axis of said lens, polarization of said filter in this position being along a helix, whereby, when the convex surface is rotated substantially one hundred eighty degrees from said position, polarization will be along a helix of opposite hand.

7. The structure defined in claim 6 with means for rotating the polarized filter in synchronism with the movement of the frames of the film.

8. The structure defined in claim 6 with means for rotating the polarized filter through approximately one hundred eighty degrees for each advance of one frame of the film.

9. The structure defined in claim 6 with power transmitting means operable by movement of the film for rotating the polarized filter through approximately one hundred eighty degrees for advance of one frame of the film.

10. The structure defined in claim 6 with a film sprocket, power transmitting means drivably connecting said film sprocket to said filter, and means to vary the length of film between said sprocket and said projector.

11. The structure defined in claim 6 with a film sprocket, power transmitting means drivably connecting said film sprocket to said filter, a member concentric with but rotatable independently of said film sprocket, a film guide means carried by said member spaced radially outward from the axis of said film sprocket and manual means to rotate said member whereby the film length between said film sprocket and said projector is altered and the relation between said filter and the frames of said film in said projector is adjusted.

12. The structure defined in claim 6 with a film sprocket having an axis parallelly spaced from the axis of the filter, power transmitting means drivably connecting said sprocket to said filter, a gear concentric with but independently rotatable with respect to said sprocket, a stud positioned on said gear radially beyond the periphery of said sprocket, a film guide roller rotatable on said stud and a manually rotatable pinion in mesh with said sprocket then around said film guide roller then to said projector.

13. For use in connection with motion picture projecting equipment which consists of a projector including a lens and a film comprising a series of frames in place in said projector in back of said lens, alternate frames having right and left stereoscopic images thereon, the improvement which comprises a transparent filter in the form of a hollow cylinder half of the circumference being polarized helically right hand and the other half helically left hand, said cylinder having its axis of rotation substantially normal to the axis of said lens and approximately in the same plane as the axis of said lens, whereby when the cylinder is rotated substantially one hundred eighty degrees, polarization will be reversed.

14. The structure defined in claim 13 with means for rotating the polarized filter one-half turn for each movement of the film a distance of one frame.

ROBERT V. BERNIER.

REFERENCES CITED

The following references are of record in the file of this patent:

FOREIGN PATENTS

| Number | Country | Date |
| --- | --- | --- |
| 482,331 | Great Britain | Mar. 28, 1938 |
| 555,670 | Great Britain | Sept. 2, 1943 |